United States Patent [19]

Keen et al.

[11] 3,768,443

[45] Oct. 30, 1973

[54] MANURE DRYING SHED ARRANGEMENT

[75] Inventors: Everett M. Keen; Anthony J. Siciliano; David A. Keen, all of Vineland, N.J.

[73] Assignee: Diamond International Corporation, New York, N.Y.

[22] Filed: Dec. 1, 1971

[21] Appl. No.: 203,807

[52] U.S. Cl. .................................. 119/22, 119/48
[51] Int. Cl. ............................................ A01k 31/04
[58] Field of Search ...................... 119/22, 48, 18

[56] References Cited
UNITED STATES PATENTS

| | | | |
|---|---|---|---|
| 2,970,567 | 2/1961 | Rubin | 119/22 |
| 2,987,038 | 6/1961 | Cole | 119/22 X |
| 3,385,266 | 5/1968 | Launder et al. | 119/22 |
| 2,309,458 | 1/1943 | Ingraham | 119/22 |
| 2,448,120 | 7/1948 | Petraske | 119/22 |
| 2,492,970 | 2/1970 | Keen et al. | 119/18 |

FOREIGN PATENTS OR APPLICATIONS

| | | | |
|---|---|---|---|
| 946,507 | 1/1964 | Great Britain | 119/22 |

*Primary Examiner*—Louis G. Mancene
*Assistant Examiner*—J. A. Oliff
*Attorney*—Karl W. Flocks

[57] ABSTRACT

A manure drying shed arrangement for starter-grower-layer cage batteries, in which chicks are kept and may be raised to maturity, comprising in combination batteries of cage rows supported by A-frames which are in turn supported on transversely extending joists. The batteries of cage rows are arranged at different elevational levels with the topmost battery being supported at the apex of the A-frame. Each battery includes a pair of cage rows each of which is secured to one leg of the A-frame. The cage rows of the lower batteries are provided with overhead manure drying sheds upon which some of the droppings from the battery above may be caught. Drying sheds are also provided beneath the lowermost battery to catch the droppings from the lowermost battery as well as any dropping not caught by the overhead sheds.

8 Claims, 5 Drawing Figures

United States Patent [19]
Keen et al.
[11] 3,768,443
[45] Oct. 30, 1973
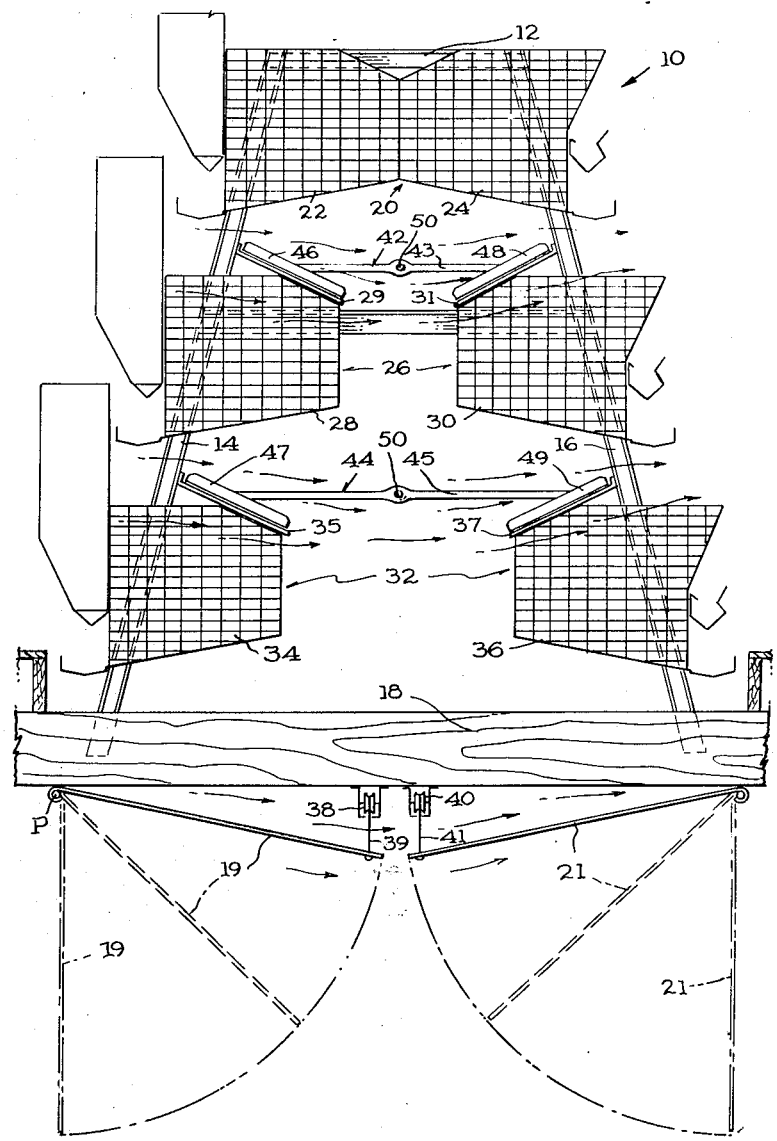

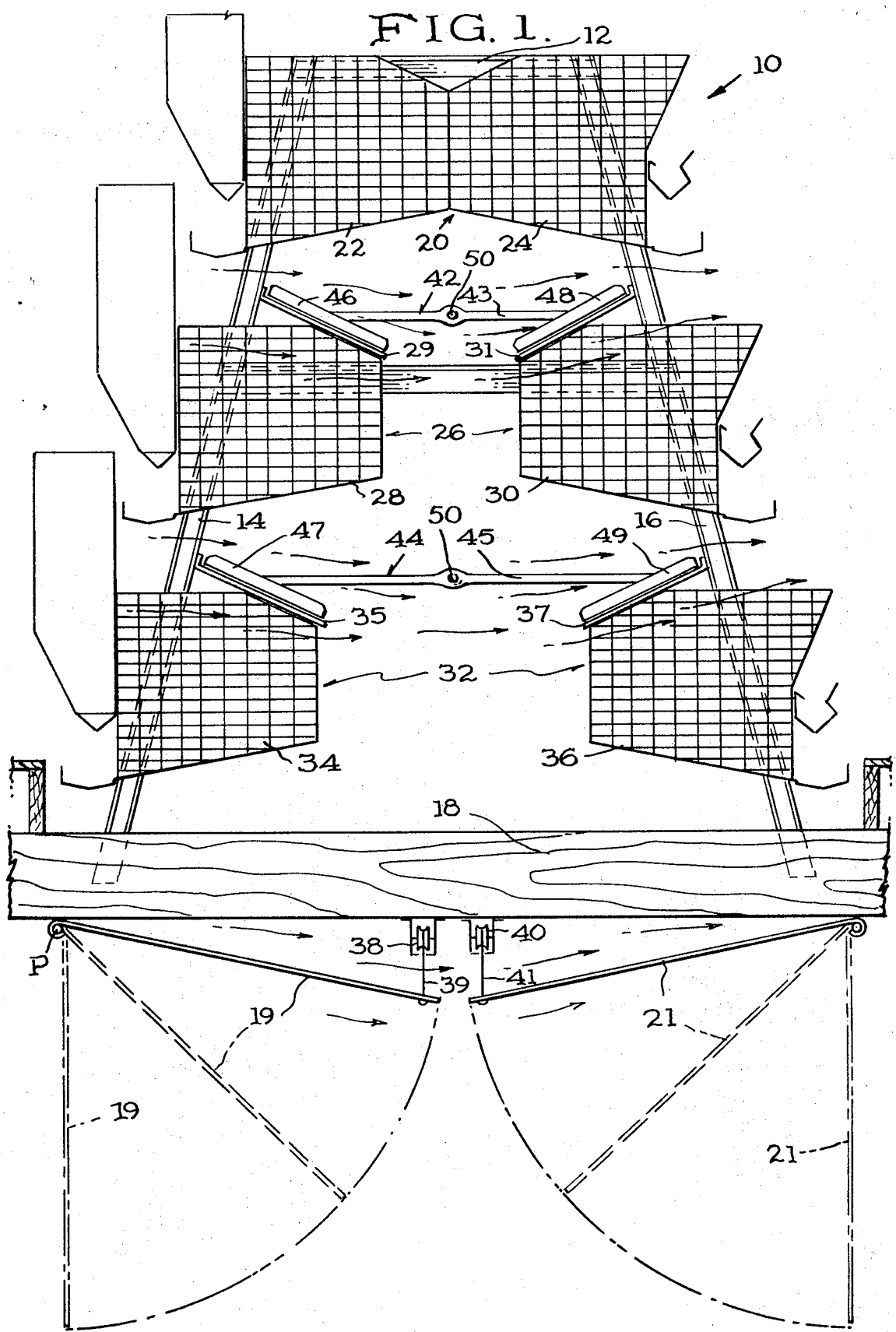

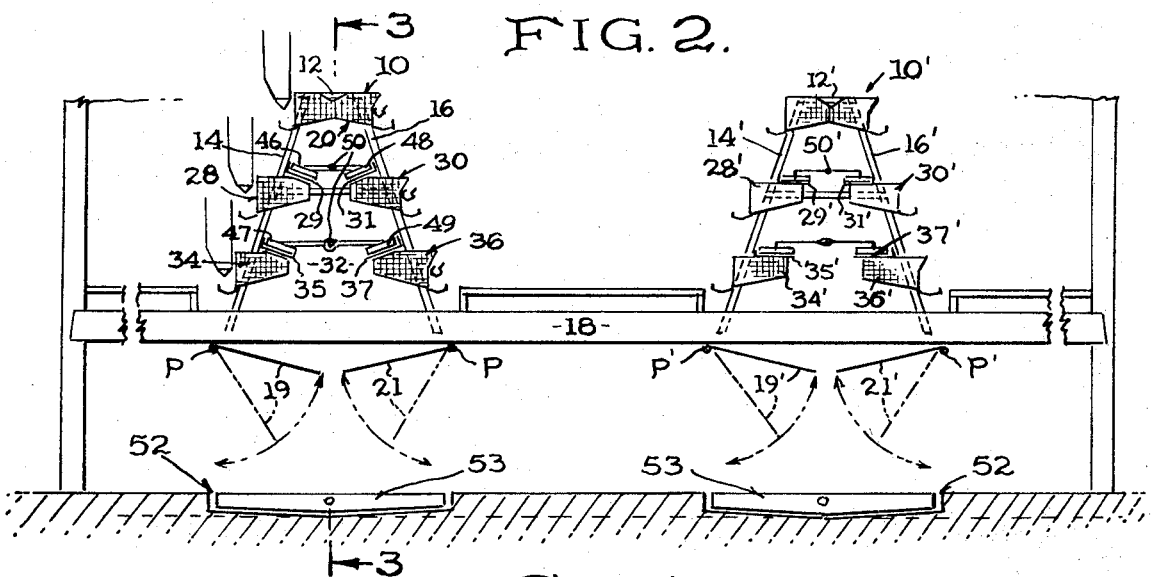
FIG. 2.
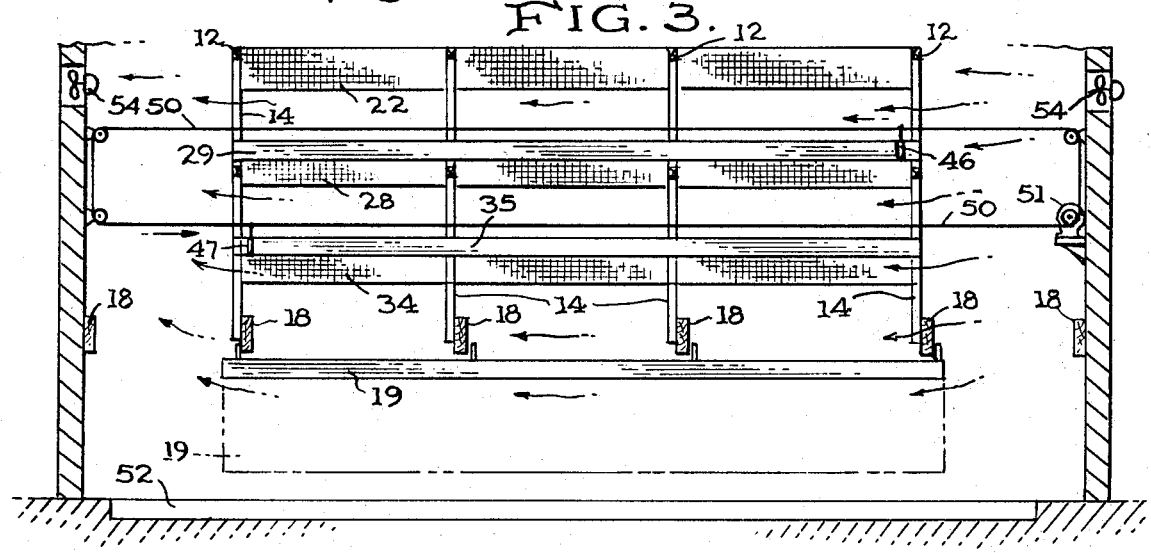
FIG. 3.
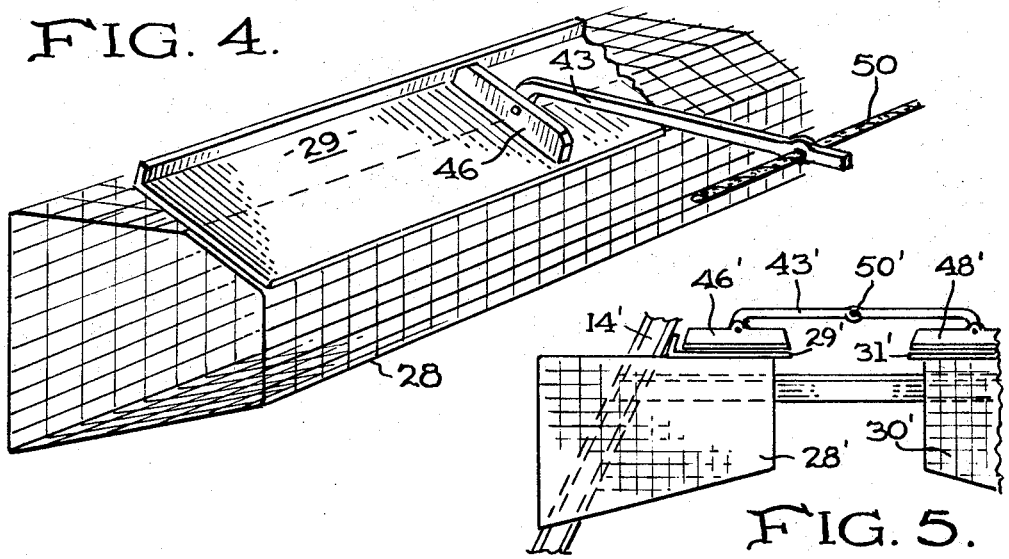
FIG. 4.
FIG. 5.

MANURE DRYING SHED ARRANGEMENT

BACKGROUND OF THE INVENTION

1. Field of the Invention

The present invention relates to confining and housing devices for poultry, and particularly to a battery cage row arrangement provided with shed elements upon which manure may be caught and dried.

2. Discussion of the prior art.

It is known that poultry manure initially is 75–80 percent moisture, and in large quantities is difficult to handle because of the weight of this moisture. Further, the manure is offensive because of its odor and also because it attracts flies which contitute both a nuisance and a health problem to the poultry, particularly in confined areas.

With the above considerations in mind it is noted that the prior art has recognized the desirability of catching the droppings from overhead cage rows to prevent their falling onto the poultry in the cage rows therebelow, as exemplified by U.S. Pat. No. 2,970,567 to Rubin and U.S. Pat. No. 3,160,141 to Crutchfield.

In the prior art arrangements, however, poultry manure and debris may drop from the lower cage rows into the pits therebelow before it is effectively dried.

SUMMARY OF THE INVENTION

The present invention relates to a new and improved cage row arrangement and method for handling poultry manure. With the arrangement and method as disclosed herein an optimum amount of moisture is efficiently and effectively removed from the manure prior to its further handling and removal from the poultry house.

According to this invention batteries of cage rows are arranged on A-frame suports with each battery at a different elevational level starting at the A-frame apex. The lower batteries are provided with overhead drying sheds secured to the roof of each cage row and one leg of the A-frame. Drying sheds are provided below the lowermost battery. The sheds below the lowermost battery may optionally be hinged along one edge to transverse joists or fixedly secured thereto.

The drying of the manure droppings caught on the various sheds is accomplished by retaining the droppings in a suspended area and moving air across the droppings to remove moisture therefrom. The air moving across the droppings may be supplied, for example, by a number of fans and the air may be recirculated under the sheds. When the manure has been sufficiently dried, for example to the extent that approximately one-third of its original weight has been removed due to moisture dried therefrom, it may be removed from the sheds by scraping it and conveying it to a heater-dryer, or spread on the ground as a fertilizer.

With much of the moisture effectively removed from the poultry manure in the above manner, it is clear that it will be much easier and less offensive to handle.

BRIEF DESCRIPTION OF THE DRAWINGS

The foregoing and other objects and advantages of the invention will be apparent from the following description and from the accompanying drawings, in which:

FIG. 1 is an end elevational view of the preferred embodiment according to this invention;

FIG. 2 shows an end elevational view, on a reduced scale, of both the preferred embodiment and an alternative embodiment of the present invention;

FIG. 3 is an elevational view along the line 3—3 of FIG. 2;

FIG. 4 is a fragmentary view in perspective showing details of a drying shed of the preferred embodiment according to this invention; and FIG. 5 is a fragmentary end elevational view showing details of the second embodiment according to this invention.

DESCRIPTION OF THE PREFERRED EMBODIMENT

Referring now more particularly to the drawings, the preferred embodiment of the novel manure drying shed arrangement for starter-grower-layer cage batteries according to this invention as illustrated in FIGS. 1–4 comprises a battery cage row arrangement 10. A plurality of A-frames 12, each of which includes legs 14 and 16 form the support for the battery cage row arrangement 10. The A-frames 12 in turn are supported by a plurality of longitudinally spaced, transversely extending joints 18. As clearly shown in FIG. 1, the preferred embodiment of this invention includes batteries of cage rows 20, 26, and 32 at different elevational levels of the A-frame 12 with the battery 20 being fixed to the A-frame 12 at the apex thereof. Each battery comprises two cage rows. Battery 20 thus comprises cage rows 22 and 24, battery 26 comprises cage rows 28 and 30, and battery 32 comprises cage rows 34 and 36. It is clear from FIG. 1 that the location of the cage rows 28 and 30 diverge from the center of the A-frame 12 along the legs 14 and 16 as do cage rows 34 and 36. Manure drying sheds 29 and 31 are secured to roof portions of the cage rows 28 and 30 extending beneath cage rows 22 and 24, respectively. The sheds 29 and 31 are also secured to the respective adjacent legs 14 and 16 of the A-frame 12. Similarly, drying sheds 35 and 37 are secured to roof portions of cage rows 34 and 36 and to the adjacent legs 14 and 16, respectively. Each of the sheds 29, 31, 35 and 37 is of substantial width and pitched toward the center of the A-frame 12 at an angle compatible to the inclination of the roof portions on which it is secured. Secured on the underside of the joist 18 are a pair of sheds 19 and 21 each of which extends substantially to the center of the A-frame 12. As shown the sheds 19 and 21 are hingedly secured to the joist 18 on pivot pins P although they may be fixedly secured to the joist 18. At the edges of the sheds 19 and 21 away from the pivot pins P, cables 39 and 41 are provided to facilitate raising and lowering the sheds 19 and 21. The cables 39 and 41 pass over pulleys 38 and 40, respectively, and may be connected for example, to a motorized winch.

An upper scraper assembly 42 comprising a connecting rod 43 on which are secured scraper blades 46 and 48 for scraping manure from sheds 29 and 31, respectively, is connected by a common drive cable 50 to a lower scraper assembly 44 which comprises a connecting rod 45 provided with legs 47 and 49 for scraping manure from sheds 35 and 37, respectively. The cable 50 is driven by a motor 51 over a plurality of idler pulleys as shown in FIG. 3. It is seen that as the scraper blade 46 is driven in one direction the scraper blade 47 is driven in the opposite direction. In this arrangement it is clear that the motor 51 is a reversible motor and that limit switches would be required to effect the proper operation of the cable driven scraper assemblies 42 and 44. It is clear from FIG. 4 that the pitch of the shed 29 facilitates the flow of manure and debris toward the center of the A-frame arrangement with the loosening thereof from the shed by the scraper blade 46. The scraped manure and debris thus gravitates toward the center of the A-frame arrangement and into the pit 52 with the lower sheds 19 and 21 being dropped to the vertical positions shown in phantom in FIG. 1. A pit scraping conveyor 53 may be provided to remove the manure from the pit 52. The drying of the manure collected on the various shed elements is effected by moving air across the droppings and under the sheds. With the arrangement of the cage rows along the legs of the A-frame 12 an optimum movement and circulation of air thereacross is afforded. To provide further effectiveness in moving air across the various sheds additional circulating fans 54 may be strategically placed to both accelerate the rate and increase the percentage of moisture removed from the manure.

It is clear from FIG. 1 that much of the droppings from cage rows 22 and 24 will be caught on sheds 29 and 31, respectively. Some of the droppings from cage rows 22 and 24, however, will fall beyond the extent of sheds 29 and 31, respectively, and will be caught by the lower sheds 19 and 21. Similarly, much of the droppings from cage rows 28 and 30 will be caught on sheds 35 and 37, respectively. The droppings from cage rows 28 and 30 falling beyond the extent of sheds 35 and 37 will also be caught by the lower sheds 19 and 21. As the droppings are caught and held on the various drying sheds 29, 31, 35, 37, 19 and 21, the scraper assemblies 42 and 44 are inactivated with the driving motors 51 turned off. At this time currents of air are moved across the droppings on the sheds and circulated thereunder with the fans 54 turned on for that purpose. Upon drying the manure to approximately one-third of its original weight, the motor 51 may be turned on to activate the scraper assemblies 42 and 44. For example, with the scraper blade 46 moving from right to left and the scraper blade 47 moving from left to right as shown in FIG. 3, the dry manure may be scraped off the sheds 29 and 35, respectively. It is noted that each of the drying sheds is of substantial breadth, such as shed 29 shown in FIG. 4, for example. Because each of the sheds is of substantial breadth, it thus affords a widespread drying surface rather than a mere deflecting shield.

ALTERNATIVE EMBODIMENT

Referring to the right portion of FIG. 2, an alternative arrangement 10 of this invention may be seen with details shown on a larger scale in FIG. 5. The battery cage row arrangement 10' is generally similar to that of the preferred embodiment 10 except that the cage rows 28' and 34' secured on A-frame leg 14' and cage rows 30' and 36' secured on leg 16' all include roofs which are substantially completely horizontal. Accordingly, the drying sheds 29', 31', 35' and 37', which are secured to the roofs of the cage rows 28', 30', 34' and 36', respectively, and the adjacent legs 14' and 16' of the A-frame 12', all extend in a substantially completely horizontal plane. Thus, the scraper blades 46' and 48', for example, which are driven by a cable 50' through connecting rod 43', extend in a substantially completely horizontal direction above the associated drying sheds 29' and 31'.

It is also noted that although the lower drying sheds 19 and 21 as shown in FIG. 1 of the preferred embodiment are adjustable from a substantially horizontal position to the lowered vertical position shown in phantom, they may instead be permanently secured in a substantially horizontal position.

Although we have described our invention with a certain degree of particularity, it is understood that the present disclosure has been made only by way of example and that numerous changes and details of construction and the combination and arrangement of parts may be resorted to without departing from the spirit and scope of the invention as hereinafter claimed.

What is claimed is:

1. A manure drying shed arrangement for starter-grower-layer cage batteries in which chicks are kept and may be raised to maturity comprising in combination a plurality of A-frame members supported on joist members, batteries of cage rows supported on said A-frame members, each of said batteries being supported at different elevational levels on said A-frame members and including a pair of cage rows, one of said batteries being supported at the apex of said A-frame members, at least a second of said batteries being supported with the cage rows thereof on separate legs of said A-frame members and diverging from the center of said A-frame members downwardly along the legs thereof, first manure shed means of substantial width secured over said second battery and beneath said first battery whereby some of the droppings therefrom may be caught and additional manure shed means of substantial width in the form of a pair of hinged members secured opposite from the center of said A-frame member and adjacent the foot of each leg of the A-frame members whereby the droppings from the battery at the apex falling past the first manure shed means may be caught and also whereby the droppings from other batteries thereabove may be caught, said hinged members having a downwardly extending vertical position and substantially horizontal catching position.

2. The manure drying shed arrangement according to claim 1, characterized in that air circulating means are provided to accelerate and increase the time rate and percentage of moisture removed from manure collected on said shed means.

3. The manure drying shed arrangement according to claim 2, characterized in that the cage rows of said second battery include roof lines which lie in a substantially horizontal plane with said first manure shed means secured thereon.

4. The manure drying shed arrangement according to claim 1 characterized in that said hinged members include cable elements attached to adjacent free edges thereof to facilitate raising and lowering said hingedly secured members.

5. The manure drying shed arrangement according to claim 4, characterized in that said cable elements extend over at least one pulley member and may be selectively drawn up or fed out to raise or lower said additional shed means.

6. The manure drying shed arrangement according to claim 5, characterized in that the cage rows of said second battery includes roof portions pitched toward the center of the A-frame members with said first manure shed means fixedly secured thereon at the same pitch.

7. The manure drying shed arrangement according to claim 6, characterized in that at least a third battery of cage rows is fixedly supported on said A-frame members with the cage rows thereof below the cage rows of said second battery and diverging farther from the center of said A-frame members.

8. The manure drying shed arrangement according to claim 7, characterized in that separate scraper assemblies are provided for scraping the manure from the shed means of each of said second and third batteries with said separate scraper assemblies being connected to a common endless drive cable.

* * * * *